# (12) United States Patent
Schmitt et al.

(10) Patent No.: US 7,070,240 B2
(45) Date of Patent: Jul. 4, 2006

(54) HEAD RESTRAINT ARRANGEMENT FOR A VEHICLE SEAT AND VEHICLE SEAT FITTED WITH SAID HEAD RESTRAINT ARRANGEMENT, PARTICULARLY SPARE SEAT

(75) Inventors: Daniel Schmitt, Reitwiller (FR); Daniel Metz, Strassburg (FR); Oliver Seel, Rottenburg (DE)

(73) Assignee: Johnson Controls GmbH, Burscheld (DE)

( * ) Notice: Subject to any disclaimer, the term of this patent is extended or adjusted under 35 U.S.C. 154(b) by 0 days.

(21) Appl. No.: 10/481,689

(22) PCT Filed: Jun. 20, 2002

(86) PCT No.: PCT/EP02/06828

§ 371 (c)(1),
(2), (4) Date: Jul. 19, 2004

(87) PCT Pub. No.: WO03/000517

PCT Pub. Date: Jan. 3, 2003

(65) Prior Publication Data

US 2004/0245834 A1    Dec. 9, 2004

(30) Foreign Application Priority Data

Jun. 22, 2001    (DE) .......................... 201 10 342 U

(51) Int. Cl.
*A47C 1/10*    (2006.01)
*B60N 2/02*    (2006.01)
*B60N 2/32*    (2006.01)

(52) U.S. Cl. ........................ 297/410; 297/408; 297/15; 297/378.1; 296/65.09

(58) Field of Classification Search ................. 297/410, 297/408, 378.1, 336, 335, 340, 15; 296/65.09
See application file for complete search history.

(56) References Cited

U.S. PATENT DOCUMENTS

| 3,746,389 | A | * | 7/1973 | Fourrey ........................ 297/15 |
| 4,376,552 | A | | 3/1983 | Pilhall .......................... 297/391 |
| 4,519,646 | A | * | 5/1985 | Leitermann et al. .......... 297/15 |
| 4,761,034 | A | * | 8/1988 | Saito ........................... 297/408 |
| 5,003,240 | A | * | 3/1991 | Ikeda .......................... 318/603 |
| 5,011,225 | A | * | 4/1991 | Nemoto ....................... 297/408 |
| 5,026,120 | A | * | 6/1991 | Takeda et al. .............. 297/408 |
| 5,145,233 | A | * | 9/1992 | Nagashima .................. 297/408 |
| 5,288,129 | A | * | 2/1994 | Nemoto ....................... 297/410 |
| 5,590,933 | A | * | 1/1997 | Andersson ................... 297/408 |
| 5,669,668 | A | * | 9/1997 | Leuchtmann ............... 297/408 |
| 5,738,411 | A | * | 4/1998 | Sutton et al. ........... 297/378.12 |
| 5,895,094 | A | * | 4/1999 | Mori et al. .................. 297/410 |

(Continued)

FOREIGN PATENT DOCUMENTS

DE    3325927 C1    1/1985

(Continued)

*Primary Examiner*—Peter M. Cuomo
*Assistant Examiner*—Sarah B. McPartlin
(74) *Attorney, Agent, or Firm*—Foley & Lardner LLP

(57) ABSTRACT

A headrest arrangement for a vehicle seat consisting of a back and a bottom seating part. Said arrangement comprises a headrest part that is connected to the back of the seat, with the connection configured in such a way that the headrest part can be moved between an in-use position arranged above the back of the seat and corresponding to its headrest function and a non-use position wherein the headrest part can be releasably locked in both positions. The headrest part in non-use position and relative to the in-use position is lowered in the direction of the seating part and is arranged horizontally in the area of the front part of the back of the seat. The invention also relates to a vehicle seat fitted with said headrest arrangement.

15 Claims, 4 Drawing Sheets

U.S. PATENT DOCUMENTS

| | | | |
|---|---|---|---|
| 5,906,414 A * | 5/1999 | Rus | 297/408 |
| 6,074,010 A * | 6/2000 | Takeda | 297/391 |
| 6,074,011 A * | 6/2000 | Ptak et al. | 297/408 |
| 6,113,187 A * | 9/2000 | Sugiyama et al. | 297/335 |
| 6,299,254 B1 * | 10/2001 | Dinh et al. | 297/408 |
| 6,318,784 B1 * | 11/2001 | Nishide | 296/65.09 |
| 6,508,512 B1 * | 1/2003 | Saberan et al. | 297/408 |
| 6,663,181 B1 * | 12/2003 | Nygren et al. | 297/408 |
| 6,860,564 B1 * | 3/2005 | Reed et al. | 297/408 |
| 2003/0006637 A1 * | 1/2003 | Jach et al. | 297/336 |
| 2003/0098592 A1 * | 5/2003 | Nygren et al. | 296/65.09 |
| 2004/0100113 A1 * | 5/2004 | Katz et al. | 296/65.09 |
| 2004/0160081 A1 * | 8/2004 | Horsford et al. | 296/65.09 |

FOREIGN PATENT DOCUMENTS

| | | |
|---|---|---|
| DE | 4023127 C1 | 1/1992 |
| DE | 19821396 C1 | 3/1999 |
| DE | 19938881 C1 | 12/2000 |
| DE | 29916386 U1 | 3/2001 |

* cited by examiner

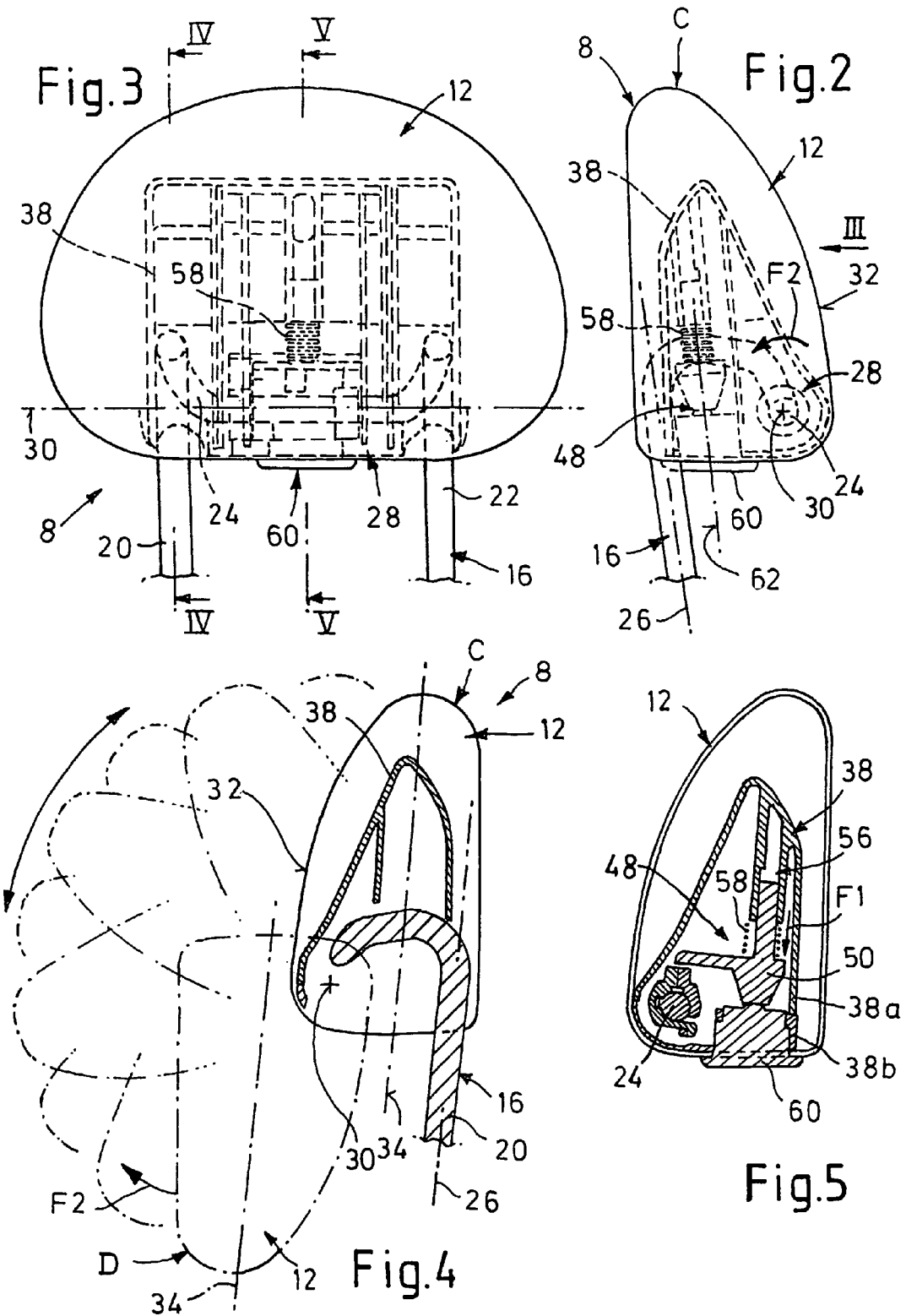

US 7,070,240 B2

HEAD RESTRAINT ARRANGEMENT FOR A VEHICLE SEAT AND VEHICLE SEAT FITTED WITH SAID HEAD RESTRAINT ARRANGEMENT, PARTICULARLY SPARE SEAT

CROSS-REFERENCE TO RELATED PATENT APPLICATIONS

This application claims benefit to International Application No. PCT/EP02/06828 filed on Jun. 20, 2002, and published in the English language under PCT Article 21(2); German application no. DE20110342.7, filed Jun. 22, 2001, all of which are incorporated herein by these references.

BACKGROUND

The present invention relates to a head restraint arrangement for a vehicle seat comprising a backrest and a lower seat surface part, having a head-supporting part which is connected or can be connected to the backrest via retaining means.

The invention furthermore also relates to a vehicle seat fitted with a head restraint arrangement of this type, having a lower seat surface part and a backrest which can be folded over.

It is known to provide vehicle seats with head restraints which are intended to protect the seat user against accident-included injuries in the region of the cervical vertebrae, i.e. against "whiplash". It has also been known from a long time to guide the head restraint on or in the backrest in a manner such that it can be adjusted in height via restraining means and such that it can be locked in different positions in order to adapt it to users of differing size.

In many cases, it is intended that vehicle seats can be changed between different positions to utilize the vehicle in a variable manner. In this case, because of the head restraint which is arranged protruding in the upper region, folding the backrest over in particular frequently causes problems in respect of possible collisions with other vehicle parts. Sometimes, the head restraint even has to be entirely removed before the backrest is folded over.

SUMMARY

The present invention is based on the object of providing a head restraint arrangement of the above-mentioned type and a seat fitted with said head restraint arrangement, with which a particularly easy change in the arrangement of the seat and its parts is possible.

According to the invention, this is achieved first of all in accordance with the claims by the fact that the retaining means are designed in such a manner that the head-supporting part can be transferred between an operative position, which is arranged in accordance with its head-supporting function above the backrest, and an inoperative position and is locked releasably in both positions, the head-supporting part, in the inoperative position, firstly being lowered relative to the operative position, in the direction of the seat surface part and, secondly, being arranged lying in the region of a backrest front side in front of the backrest.

A vehicle seat fitted with a novel head restraint arrangement of this type is distinguished in accordance with the claims by the fact that, starting from an operative position, which is suitable for sitting, the seat surface part can be folded over through approximately 180° about a transverse axis, which is arranged in its front region away from the backrest, in such a manner that it lies with its lower side, which points upward, in a plane with an adjacent loading floor of the vehicle, it being possible, in the inoperative position of the head-supporting part, for the backrest to be folded over through approximately 90° about a lower transverse axis in the direction of the seat surface part, and it then lying with its rear surface likewise approximately in the plane of the loading floor. In this case, it is expedient, firstly, for the backrest together with the head-supporting part situated locked in the inoperative position, to be accommodated, in the folded-over position of the backrest, and, secondly, for the lower seat surface part with its seat cushion in the inverted position to be accommodated in each case in a trough-like receptacle of the vehicle.

The invention makes a transfer between the operative and inoperative position very simple and comfortable; a complete removal of parts, such as, in particular, the head restraint, can be rendered superfluous, so that there is also no risk of any part being lost; on the contrary, all of the components are always available to the user in the vehicle for use in a variable manner. During the transfer of the backrest into the folded-over position of the backrest, the locking according to the invention of the head restraint part in its inoperative position, which is situated in front of the backrest, is of particularly advantageous importance because it reliably avoids uncontrolled oscillating movements and resultant problems when introducing or placing the head restraint part into the associated receiving trough of the vehicle without the head restraint part here having to be secured or guided awkwardly by hand.

Further advantageous design features and advantages of the invention achieved thereby are contained in the subclaims, which are dependent on claims and 33, and in the following description.

DESCRIPTION OF DRAWINGS

The invention will be explained more precisely with reference to a preferred exemplary embodiment which is illustrated in the drawing, in which:

FIG. 2 shows an enlarged view just of the head-supporting part, in a view corresponding to FIG. 1, FIG. 3 shows a front view of the head-supporting part in the arrow direction III according to FIG. 2 (likewise illustrated partially cut away and transparently), FIG. 4 shows a schematic sectional view in the plane IV—IV according to FIG. 3 in different positions of the head-supporting part during the transfer between its two positions, FIG. 5 shows a section in the plane V—V according to FIG. 3.

DETAILED DESCRIPTION OF EXEMPLARY EMBODIMENTS

Figure 1:
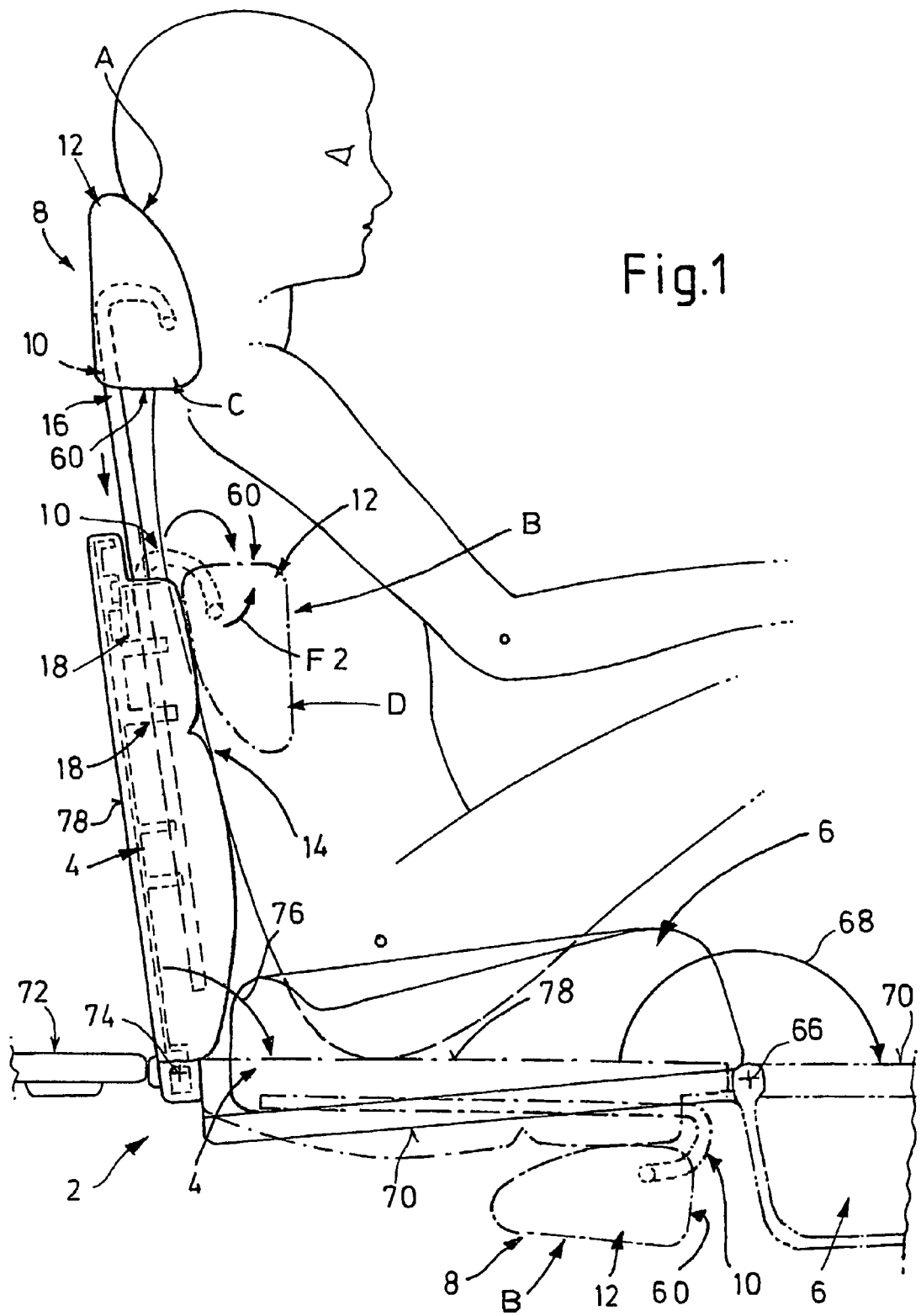
FIG. 1 shows a schematic, partially cutaway side view of a vehicle seat with a head restraint arrangement according to the invention, with different positions of the components being illustrated simultaneously.
Figure 6:
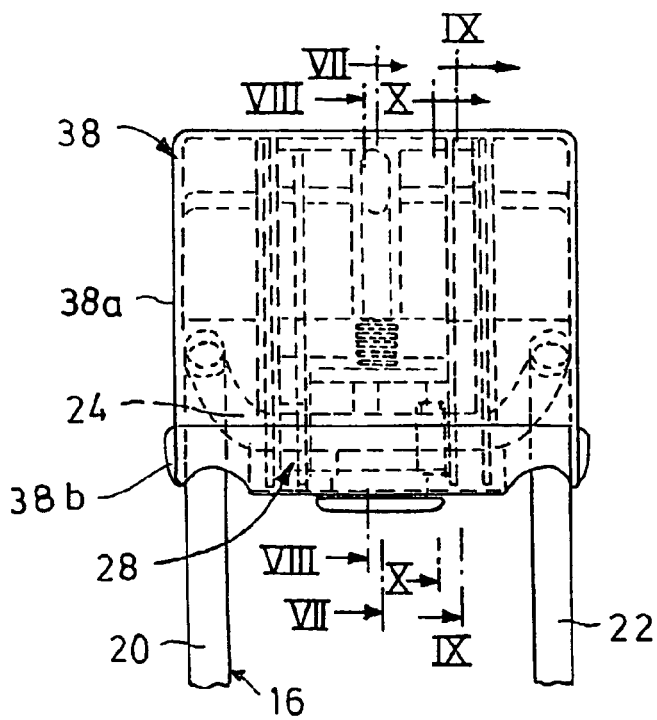
FIG. 6 shows a view analogous to FIG. 3 just of an inner supporting housing of the head-supporting part together with the upper region of a retaining-rod element.

In the various figures of the drawing, identical parts and components are always provided with the same reference numbers, and so they are generally also only described once in each case.

FIG. 1 illustrates a vehicle seat 2 which comprises a backrest 4 and a lower seat surface part 6 and has a head restraint arrangement 8 according to the invention. A head-supporting part 12 is connected or can be connected to the backrest 4 via retaining means 10.

As can furthermore be gathered from FIG. 1, the retaining means 10 are designed in such a manner that the head-supporting part 12 can be transferred between an operative position A, which is arranged in accordance with its head-supporting function above the backrest 4, and an inoperative position B and is locked releasably in both positions A, B. In the inoperative position B, the head-supporting part 12 is, firstly, lowered relative to the operative position A in the direction of the lower seat surface part 6 and, secondly, is arranged lying in the region of a backrest front side 14 in front of the backrest 4. In this manner, the invention eliminates the projecting length, which is necessary in the operative position A, of the head-supporting part 12 protruding upward above the backrest 4 by, in the inoperative position B, no parts of the head-supporting part 12 protruding any more over the backrest 4.

It is expedient for the invention if the retaining means 10 have a retaining-rod element 16 having two retaining rods 20, 22 which are parallel to each other and are guided in a longitudinally displaceable manner in guides 18 of the backrest 4 (which can only be seen in FIG. 1). In addition, the retaining rods 20, 22, which can be displaced in the guides 18, can be locked in at least two, preferably, for the purpose of adjusting the height, in a plurality of, different positions. The retaining rods 20, 22 are connected to each other, in particular in one piece via a transverse web 24, in their end region which is situated outside the backrest 4 and the guides 18. The retaining rods 20, 22 are designed here such that they are curved "in the manner of a walking stick" in their upper end region in the transition to the transverse web 24 in such a manner that the transverse web 24 is arranged offset with respect to a guide plane 26, which is defined by the two parallel retaining rods 20, 22 (see, in this respect, FIGS. 2 and 4, for example), in the direction of the backrest front side 14.

The head-supporting part 12 is guided via a bearing arrangement 28 on the transverse web 24 of the retaining-rod element 16 in a manner such that it can be pivoted about an axis of rotation 30, which is defined by the transverse web 24 or is identical with the longitudinal central axis of the transverse web 24, and in a manner such that it can be locked in (at least) two different positions. In the preferred exemplary embodiment, the head-supporting part 12 can be pivoted through approximately 180° and can be locked alternatively in two positions, specifically either in a supporting position C extending upward approximately as an elongation of the retaining rods 20, 22 (see FIGS. 2 and 4) or in a rest position D which, starting from the transverse web 24, extends in an inverted manner downward approximately parallel to the retaining rods 20, 22 (see FIG. 4 in this respect where the process of pivoting it over between the positions C and D is illustrated with reference to numerous intermediate positions). Furthermore, it is expedient, for the transfer of the head-supporting part 12 from the operative position A into its inoperative position B (FIG. 1) if it is arranged with a central plane 34, which runs approximately parallel to a front head-supporting surface 32 (see FIG. 4), asymmetrically with respect to the axis of rotation 30 in such a manner that the pivoting between the supporting position C and the rest position D causes it to be offset in each case with respect to the axis of rotation 30. In the supporting position C, the central plane 34 is situated, according to FIG. 4, behind the axis of rotation 30 and, in the rest position D, the central plane 34 is situated in front of the axis of rotation 30. As a result, the head-supporting part 12 is positioned, as it is being lowered by pushing the retaining rods 20, 22 into the guides of the backrest 4, in front of the backrest front side 14 of the backrest 4 (inoperative position B according to FIG. 1).

Figure 8:
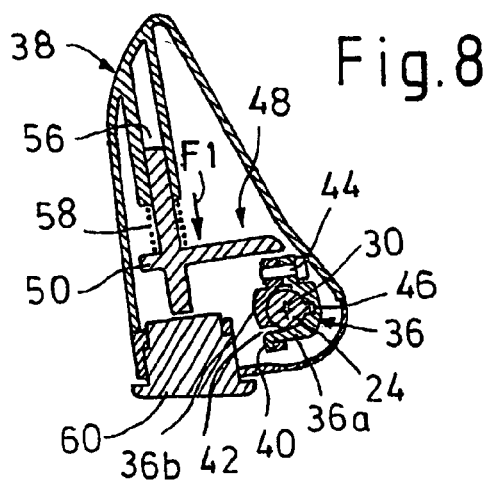
FIG. 8 shows a section in the plane VIII—VIII according to FIG. 6.
Figure 11:
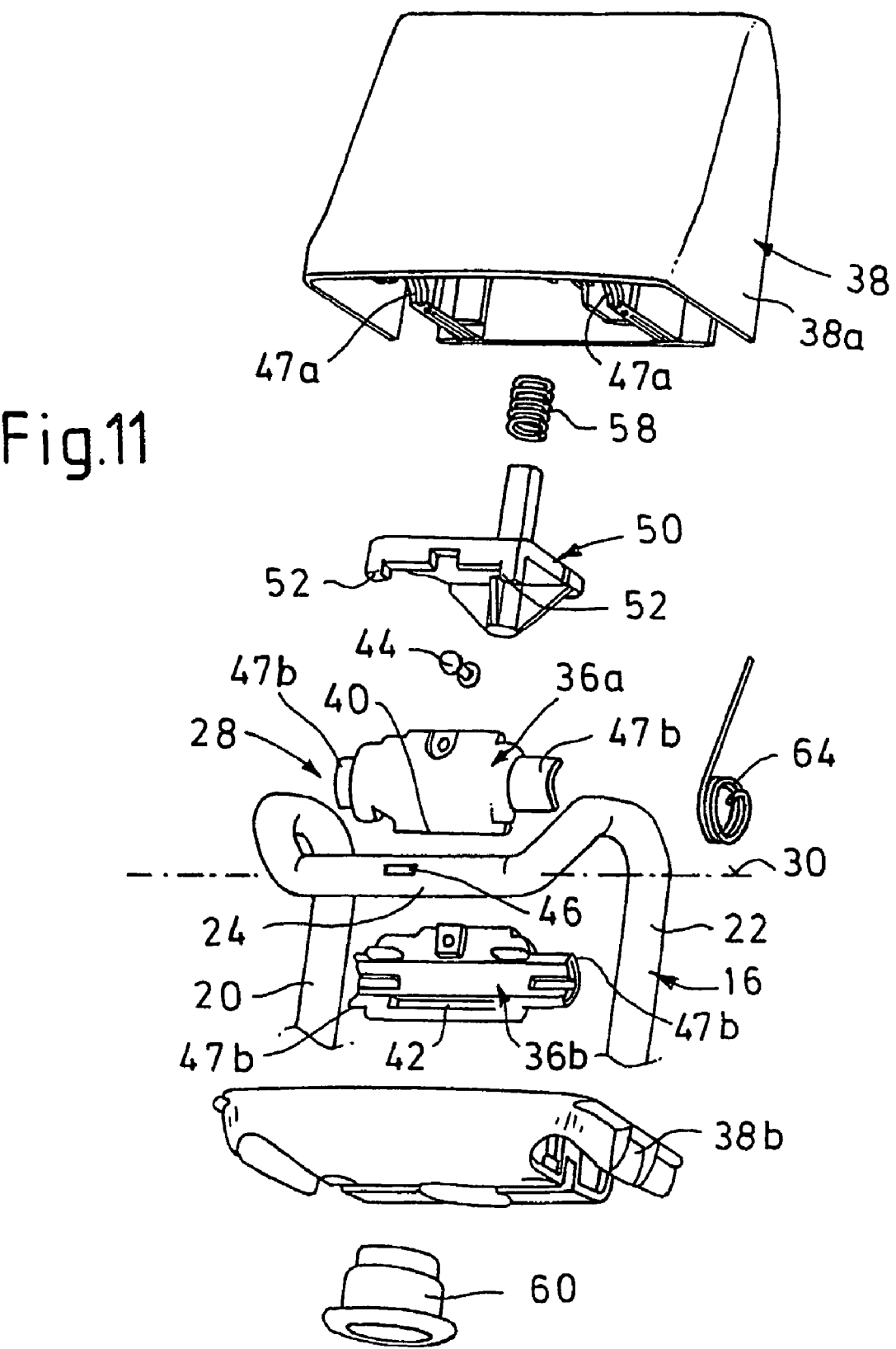
FIG. 11 shows a perspective exploded illustration of the functionality essential parts of the head restraint arrangement according to the invention.

The bearing arrangement 38 has a bearing part 36 which sits in a rotationally fixed manner, i.e. secured against rotation, on the transverse web 24 of the retaining-rod element 16 and on which an inner supporting housing 38 of the head-supporting part 12 is guided rotatably. As emerges from FIG. 11, the bearing part 36 is expediently composed of two halves 36a and 36b which are connected to each other enclosing the transverse web 24. This can take place on one side by a form-fitting engagement of a retaining web 40 of the one bearing-part half 36a in a corresponding retaining opening 42 in the other bearing-part half 36b, the two halves being connected on the other side, for example, by means of a rivet 44 or similar connecting element (in addition to FIG. 11 also see FIG. 8). For the bearing part 36 to sit in a rotationally secure manner on the transverse web 24, form-fitting means are provided, in particular, for example, according to FIG. 11, at least one projecting lug 46 of the transverse web 24, which engages in a corresponding holder within the bearing part 36 (also see FIG. 8). The supporting housing 38 sits with inner bearing sections 47a rotatably on two lateral bearing sections 47b of the bearing part 36 (FIG. 11). In this case, the supporting housing 38 comprises two housing parts 38a and 38b which are connected, for example screwed and/or latched, to each other enclosing the bearing part 36.

Figure 7:
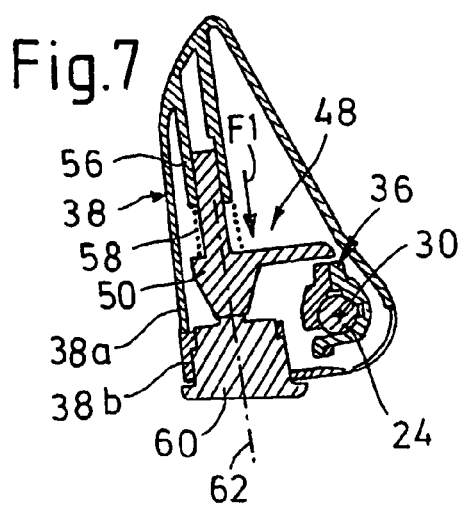
FIG. 7 shows a section in the central plane VII—VII according to FIG. 6.
Figure 10:
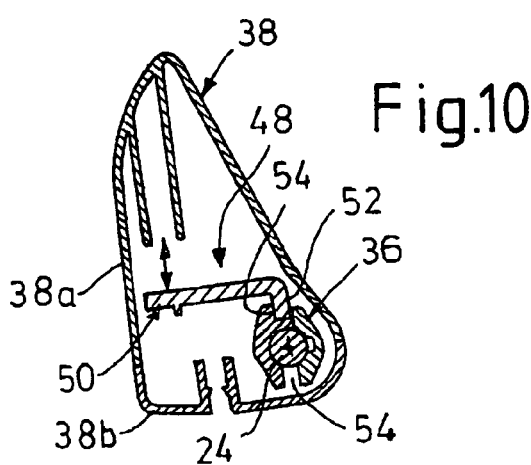
FIG. 10 shows a further section in the plane X—X according to FIG. 6.

A locking device 48 which interacts with the bearing part 36 and is intended for the supporting position and the rest position is provided within the supporting housing 38. This locking device has a bolt slide 50 which is guided displaceably in the supporting housing 38 and uses at least one bolt element 52 to engage, either in the supporting position C or in the rest position D, in a respectively corresponding bolt opening 54 in the bearing part 36 (see in particular FIG. 10 in this respect). As emerges, for example, from FIGS. 5, 7 and 8, the bolt slide 50 is guided in a slide holder 56 formed within the supporting housing 38. the bolt slide 50 preferably has two laterally offset bolt elements 52. Two bolt openings 54 are accordingly also provided in each case for the two positions C and D. The bolt slide 50 is acted upon here with a spring force F1 in the direction of its locking position. According to FIGS. 5, 7, 8 and 11, a helical compression spring 58, for example, is arranged for this purpose between the bolt slide 50 and the slide holder 56 of the supporting housing 38.

The bolt slide 50 interacts with an actuating element 60 which is accessible from the outside for, preferably, manual actuation by pushing, in particular an actuating element in the manner of a push-button. This actuating element 50 is preferably arranged in a region of the head-supporting part 12 which, in the supporting position C, points downward in the direction of the backrest 4 and, in the rest position D, points upward in the opposite direction. This makes practical, very comfortable actuation possible. By means of the actuating element 60, the bolt slide 50 can be displaced in the direction of a displacement axis or displacement plane 62 which, in the supporting position C, is arranged lying approximately parallel to the guide plane 26, in the region situated between the guide plane 26 of the retaining rods 20, 22 and the axis of rotation 30. Reference is made in this respect to FIG. 2, in particular.

Figure 9:
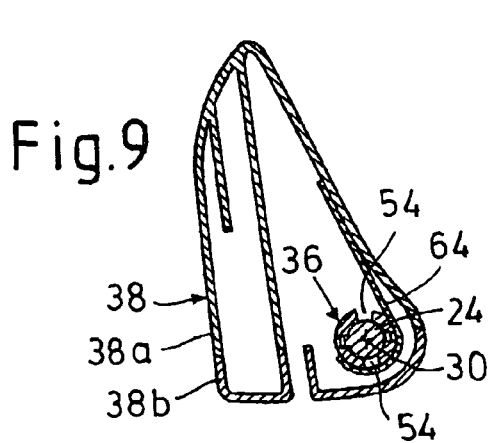
FIG. 9 shows a section in the plane IX—IX according to FIG. 6.

It is furthermore advantageous if the head-supporting part 12 is acted upon with a rotational spring force F2 in such a manner that—in each case after the lock is released—the pivoting in the one direction of rotation takes place counter to the rotational spring force F2 by means of an external actuating force (in particular manually) which exceeds the latter and takes place in the other direction of rotation essentially automatically by means of the rotational spring force F2. In the preferred exemplary embodiment, the rotational spring force F2 is directed in such a manner that, starting from the rest position D, the supporting position C is automatically reached by the spring force F2 after the lock is released. However, an inverted variant is also included within the scope of the invention. As emerges from FIGS. 9 and 11, in order to produce the rotational spring force F2, a torsion spring 64 is provided which is designed, for example, as a coiled leg spring and is arranged supported coaxially with respect to the axis of rotation 30 between the head-supporting part 12 or the interior of the supporting housing 38, on the one hand, and the retaining-rod element 16 or the bearing part 36, on the other hand.

As furthermore emerges from FIG. 1, the head restraint arrangement 8 according to the invention is preferably designed for a vehicle seat 2 of this type which can likewise be transferred between an operative position, which is suitable for sitting, and an inoperative position. For transfer into the inoperative position, the seat surface part 6 can be folded over through approximately 180° in the arrow direction 68 about a transverse axis 66, which is arranged in its front region away from the backrest 4, in such a manner that it lies with its lower side 70, which then points upward, approximately in a plane 72 with an adjacent loading floor of the vehicle. In addition, in the locked inoperative position B of the head-supporting part 12, the backrest 4 can be folded over through approximately 90° in the arrow direction 76 about a lower transverse axis 74 in the direction of the seat surface part 6, so that it then lies with its rear surface 78 likewise approximately in the plane 72 of the loading floor. This configuration enables the vehicle seat 2 to be used, in particular, as an additional seat, spare seat or child's seat, specifically, in particular, in an arrangement in the rear region of the vehicle, in which it is oriented rearward with respect to the actual direction of travel. The backrest 4, with the head-supporting part 12 situated locked in the inoperative position B is accommodated, in the folded-over position of the backrest, in a trough-like receptacle of the vehicle. the same also applies for the seat surface part 6, which, in its folded-over position with its upholstery downward, is situated in a floor trough. Both seat parts 4, 6 then use their rear or lower sides 70, 78 to supplement the loading area of the vehicle.

Owing to the limited structural space in the rear region of the vehicle, the backrest 4 of a spare seat of this type may be designed to be only relatively low or short. In the case of the dummy which is illustrated in FIG. 1 of a female of the "5$^{th}$ percentile", the backrest 4 reaches with its upper edge only approximately as far as the lower edges of the shoulder blades. The head restraint arrangement 8 according to the invention is therefore required in order to provide the occupant, in her sitting position which is turned rearward, with sufficient grip in the head and neck region during braking maneuvers.

The invention is not confined to the exemplary embodiments illustrated and described, but also encompasses all variants of equivalent effect within the meaning of the invention. Furthermore, the invention is also not yet confined to the combination of features defined in the claims but can also be defined by any other desired combination of particular features of all disclosed individual features.

The invention claimed is:

1. A head restraint arrangement (8) for a vehicle seat (2) having a backrest (4) and a lower seat surface part (6), the head restraint arrangement comprising:

a head-supporting part (12) coupled to the backrest (4) via a retainer (10), configured to provide the head-supporting part (12) an operative position (A) above the backrest (4), and an inoperative position (B) with the retainer locked releasably in both positions, wherein the head-supporting part (12), in the inoperative position (B), firstly being lowered relative to the operative position (A) in the direction of the seat surface part (6) and, secondly, positioned in a region of a backrest front side (14) in front of the backrest (4), wherein the retainer (10) comprises a retaining-rod element (16) having two retaining rods (20, 22) which are parallel to each other and are guided in a longitudinally displaceable manner in guides (18) of the backrest (4) and configured to be locked in at least two different positions, the retaining rods (20, 22) being connected, in one piece via a transverse web (24), in their end region which is situated outside the guides (18), wherein the head-supporting part (12) is guided via a bearing arrangement (28) on the transverse web (24) of the retaining-rod element (16) and configured to be pivoted about an axis of rotation (30) defined by the transverse web (24) and locked in at least two different positions; and wherein the retaining rods (20, 22) are curved in their end region in such a manner that the transverse web (24) is arranged offset with respect to a guide plane (26), which is defined by the two parallel retaining rods (20, 22), in the direction of the backrest front side (14).

2. The head restraint arrangement as claimed in claim 1, wherein the head-supporting part (12) can be pivoted through approximately 180° and can be locked alternatively in two positions, specifically in a supporting position (C) extending approximately as an elongation of the retaining rods (20, 22) or in a rest position (D) which, starting from the transverse web (24), extends in an inverted manner approximately parallel to the retaining rods (20, 22).

3. The head restraint arrangement as claimed in claim 2, wherein the head-supporting part (12) is arranged with a central plane (34), which runs approximately parallel to a head-supporting surface (32), asymmetrically with respect to the axis of rotation (30) in such a manner that the pivoting between the supporting position (C) and the rest position (D) causes it to be offset in each case with respect to the axis of rotation (30).

4. The head restraint arrangement as claimed in claim 2, wherein the head-supporting part (12) is acted upon with a rotational spring force (F2) in such a manner that the pivoting in the one direction of rotation takes place counter to the rotational spring force (F2) and takes place in the other direction of rotation automatically by means of the rotational spring force (F2).

5. The head restraint arrangement as claimed in claim 4, wherein the rotational spring force (F2) is configured in such a manner that, starting from the rest position (D), the supporting position (C) is automatically reached after the head-supporting part (12) is unlocked.

6. The head restraint arrangement as claimed in claim 4 wherein in order to produce the rotational spring force (F2), a torsion spring (64) is provided which is configured as a coiled leg spring and is arranged supported between the head-supporting part (12) and one of the retaining-rod element (16) and the bearing part (36).

7. The head restraint arrangement as claimed in claim 1 wherein the bearing arrangement (28) has a bearing part (36) which sits in a rotationally fixed manner on the transverse web (24) of the retaining-rod element (16) and on which a supporting housing (38) of the head-supporting part (12) is guided rotatably, a locking device (48) which interacts with the bearing part (36) and configured for the supporting and rest positions being provided in the supporting housing (38).

8. The head restraint arrangement as claimed in claim 7, wherein the locking device (48) has a bolt slide (50) which is guided displaceably in the supporting housing (38) and uses at least one bolt element (52) to engage, either in the supporting position (C) or in the rest position (D), in a respectively corresponding bolt opening (54) in the bearing part (36).

9. The head restraint arrangement as claimed in claim 8, wherein the bolt slide (50) is acted upon by a biasing member (58) with a spring force (F1).

10. The head restraint arrangement as claimed in claim 8, wherein the bolt slide (50) interacts with an actuating element (60) which is accessible from outside the head-supporting part (12) for manual actuation by pushing an actuating element in the manner of a push-button, the actuating element (60) positioned in a region of the head-supporting part (12) which, in the supporting position (C), points downward in the direction of the backrest (4) and, in the rest position (D), points upward in the opposite direction.

11. The head restraint arrangement as claimed in claim 8, wherein the bolt slide (50) can be displaced in the direction of a displacement plane (62) which, in the supporting position (C), is arranged lying approximately parallel to the guide plane (26), in a region situated between the guide plane (26) of the retaining rods (20, 22) and the axis of rotation (30).

12. A vehicle seat (2) comprising a lower seat surface part (6); a backrest (4); and a head restraint arrangement (8) comprising:

a head-supporting part (12) coupled to the backrest (4) via a retainer (10), configured to provide the head-supporting part (12) an operative position (A) above the backrest (4), and an inoperative position (B) with the retainer locked releasably in both positions, wherein the head-supporting part (12), in the inoperative position (B), firstly being lowered relative to the operative position (A) in the direction of the seat surface part (6) and, secondly, positioned in a region of a backrest front side (14) in front of the backrest (4), and wherein the vehicle seat (2) can be transferred between an operative position, which is suitable for sitting, and an inoperative position, and it being possible for the seat surface part (6) to be folded over through approximately 180° about a transverse axis (66), which is arranged in its front region away from the backrest (4), in such a manner that it lies with its lower side (70), which then points upward, approximately in a plane (72) with an adjacent loading floor of the vehicle, and it being possible, in the locked inoperative position (B) of the head-supporting part (12), for the backrest (4) to be folded over through approximately 90° about a lower transverse axis (74) in the direction of the seat surface part (6), and it then lying with its rear surface (78) likewise approximately in the plane (72) of the loading floor.

13. The vehicle seat as claimed in claim 12, wherein the backrest (4) with the head-supporting part (12) situated locked in the inoperative position (B) is accommodated, in the folded-over position of the backrest, in a receptacle of the vehicle.

14. The vehicle seat as claimed in claim 12, wherein in the inoperative position, the upwardly pointing surfaces (70, 78) of the seat surface part (6) and backrest (4) merge flush in the plane 72 of the loading floor, with a small gap, between each other and in an adjacent surface region of the loading floor.

15. The vehicle seat as claimed in claim 12 configured for use as a spare seat in the rear region of the vehicle, in which the seat is oriented rearward with respect to the actual direction of vehicle travel.

* * * * *